3,162,687
N-(ARYLTHIOALKYL)ARALKYLAMINES
Robert C. Tweit, Wilmette, Ill., assignor to G. D. Searle & Co., Chicago, Ill., a corporation of Delaware
No Drawing. Filed July 13, 1959, Ser. No. 826,482
4 Claims. (Cl. 260—570.5)

The present invention is concerned with novel complex substituted aminoalkyl aromatic sulfides and, more particularly, with N-(arylthioalkyl)aralkylamines of the structural formula

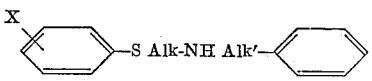

wherein X is selected from the group consisting of hydrogen, halogen, amino, nitro and lower alkyl radicals; and Alk and Alk' are lower alkylene radicals.

The lower alkyl radicals which X can represent are, for example, methyl, ethyl, propyl, butyl, pentyl, hexyl, heptyl, octyl, and the branched-chain isomers thereof. The lower alkylene radicals designated by Alk and Alk' are typified by $$-CH_2-\quad \text{(methylene)}$$
$$-CH_2CH_2-\quad \text{(ethylene)}$$
$$-CH_2CH_2CH_2-\quad \text{(trimethylene)}$$
$$-\underset{\underset{CH_3}{|}}{C}HCH_2-\quad \text{(propylene)}$$
$$-CH_2CH_2CH_2CH_2-\quad \text{(tetramethylene)}$$
$$-CH_2CH_2CH_2CH_2CH_2-\quad \text{(pentamethylene)}$$
$$-CH_2\underset{\underset{CH_3}{|}}{C}HCH_2-\quad \text{(2-methyl-1,3-propylene)}$$

Starting materials suitable for the manufacture of the compounds of this invention are substituted thiophenols of the structural formula

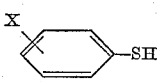

wherein X represents hydrogen, halogen, amino, nitro or lower alkyl radicals; and aralkylamines of the structural formula

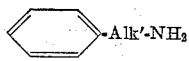

wherein Alk' is a lower alkylene radical.

The compounds of this invention in which Alk is a lower alkylene radical other than methylene result from the condensation of the aralkylamines described supra with an S-(ω-chloroalkyl)thiophenol:

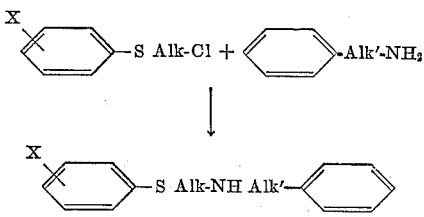

As a specific example of this process, d-α-methylphenethylamine is reacted with 1-phenylthio-2-propyl chloride to afford d-N-(1-phenylthio-2-propyl)-α-methylphenethylamine, as shown below:

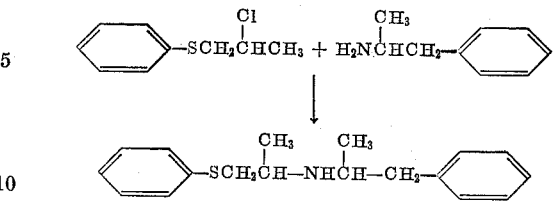

The instant compounds in which Alk is a methylene radical can be manufactured by a novel process which involves the reaction of a thiophenol, formaldehyde, and an arylalkylamine to produce N-(arylthiomethyl)aralkylamines, as shown below:

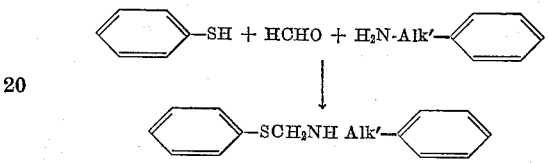

For the successful conduct of this process, the source of formaldehyde is not limited to formalin (an aqueous solution of the monomeric form) but includes also its polymeric forms, paraformaldehyde, and metaformaldehyde. The process is preferably conducted by stirring a mixture of the three reactants at a temperature of 20–60° for a period of 4–24 hours, extracting the resulting product into a suitable water-immerscible organic solvent, and isolating the product as an appropriate crystallizable salt.

As mentioned supra the instant compounds wherein Alk is a methylene radical are obtained when the third reactant is formaldehyde. As a specific example of this process, p-chlorothiophenol is reacted with α-methylphenethylamine and formaldehyde to afford N-(p-chlorophenylthiomethyl)-α-methylphenethylamine.

Although the organic bases of this reaction are conveniently isolated as a readily crystallizable salt, typically the hydrochloride or maleate, the latter are readily converted to the free amines by treatment with an inorganic alkali such as sodium carbonate.

The compounds of this invention are useful as a result of their valuable pharmacological properties. They are, for example, anorectic agents as evidenced by their ability to act upon the central nervous system to inhibit appetite.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

*Example 1*

To 14.5 parts of phenethylamine is added at room temperature 11 parts of 37% aqueous formaldehyde. Then 17.3 parts of p-chlorothiophenol and 10 parts of methanol are added and the resulting mixture stirred for 16 hours. The reaction mixture is treated with ether and water and the organic layer separated, washed with water, dried over anhydrous sodium sulfate, and acidified with isopropanolic hydrogen chloride. The resulting precipitate is recrystallized from a methanol-ether-hexane solution to afford N-(p-chlorophenylthiomethyl)phenethylamine hydrochloride, M.P. 150–153°.

By substituting 28.3 parts of o-iodothiophenol or 18.7 parts of p-ethylthiophenol and otherwise proceeding according to the herein described processes, N-(o-iodophenylthiomethyl)phenethylamine hydrochloride and N-(p-ethylphenylthiomethyl)phenethylamine hydrochloride are obtained.

*Example 2*

A mixture of 6.8 parts of d-α-methylphenethylamine, 4.5 parts of 37% aqueous formaldehyde and 7.3 parts of p-chlorothiophenol is stirred at room temperature for 6 hours. To the reaction mixture is added ether and water; and the ether layer separated, washed with water, dried over anhydrous sodium sulfate, and acidified with isopropanolic hydrogen chloride. Hexane is then added and the resulting crystals of d-N-(p-chlorophenylthiomethyl)-α-methylphenethylamine hydrochloride, M.P. 126–128°, are collected by filtration.

*Example 3*

A mixture of 6.8 parts of d-α-methylphenethylamine, 4.5 parts of 37% aqueous formaldehyde and 6.2 parts of p-methylthiophenol is stirred at room temperature for 18 hours, then water and ether added. The organic layer is separated, washed with water, dried over anhydrous sodium sulfate, and acidified with isopropanolic hydrogen chloride. Addition of hexane followed by distillation of a portion of the ether results in crystallization of d-N-(p-methylphenylthiomethyl)-α-methylphenethylamine hydrochloride, M.P. 111–115°.

*Example 4*

To a solution of 9.9 parts of 3-phenylthiopropyl chloride and 6.7 parts of d-α-methylphenethylamine in 100 parts of ethanol is added a slurry of 5 parts of sodium carbonate and 20 parts of water and the mixture heated at reflux for about 18 hours. Ether and water are added and the organic layer is separated, washed with water, and dried over anhydrous sodium sulfate. The ether solution is treated with a methanolic solution of 5 parts of maleic acid, then with 5 parts of pentane resulting in formation of crystals of d-N-(3-phenylthiopropyl)-α-methylphenethylamine maleate, M.P. 135–140°.

*Example 5*

A mixture of 276 parts of chloroacetone, 6 parts of sodium iodide, and 260 parts of acetone is allowed to stand at room temperature for about 16 hours. To a stirred suspension of 68 parts of potassium carbonate in 233 parts of thiophenol and 280 parts of acetone is added one-fourth of the chloroacetone mixture, followed by 68 parts of potassium carbonate together with additional acetone. This procedure is repeated twice more after one-half and after three-fourths of the chloroacetone solution has been added. The mixture is stirred for about 18 hours after the addition is complete, then filtered, and the filtrate concentrated in vacuo. This residue is added slowly to a cold stirred aqueous solution of 38 parts of sodium borohydride in methanol and the resulting mixture allowed to stand for about 24 hours. Ether and water are then added; and the mixture filtered, the ether layer separated, washed with water and concentrated to dryness in vacuo. Distillation of the residue in vacuo yields 1-phenylthio-2-propanol, B.P. 134–137°/10 mm.

To 118 parts of 1-phenylthio-2-propanol is added with stirring, at 5°, 119 parts of thionyl chloride. After the addition has been completed, the solution is heated on the steam bath in vacuo, then allowed to stand at room temperature for about 24 hours. The mixture is again heated on the steam bath in vacuo to remove any residual thionyl chloride, thus resulting in 1-phenylthio-2-propyl chloride.

To a solution of 9.9 parts of 1-phenylthio-2-propyl chloride and 6.7 parts of d-α-methylphenethylamine in 100 parts of ethanol is added a mixture of 5 parts of sodium carbonate and 20 parts of water, and the resulting mixture is heated at reflux for about 6 hours. After standing for about 24 hours the mixture is diluted with ether and water; and the ether layer separated, washed with water, and dried over anhydrous sodium sulfate. A methanolic solution of 5 parts of maleic acid is then added, resulting in precipitation of the maleate salt. Recrystallization from acetone affords pure d-N-(1-phenylthio-2-propyl)-α-methylphenethylamine maleate, M.P. 128–136°.

A mixture of 2 parts of this maleate, 3 parts of sodium carbonate, 100 parts of water, and 100 parts of ether is stirred for about one hour. The ether layer is separated, washed with water, dried over anhydrous sodium sulfate, and the ether distilled to afford the oily free base, d-N-(1-phenylthio-2-propyl)-α-methylphenethylamine.

What is claimed is:
1. A compound of the structural formula

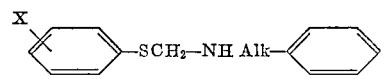

wherein X is a halogen and Alk is a lower alkylene radical.
2. N - (p-chlorophenylthiomethyl)-α-methylphenethylamine.
3. N-(p-chlorophenylthiomethyl)phenethylamine.
4. N - (p-methylphenylthiomethyl)-α-methylphenethylamine.

References Cited in the file of this patent
UNITED STATES PATENTS

| | | |
|---|---|---|
| 2,266,747 | Engelmann et al. | Dec. 23, 1941 |
| 2,683,719 | Kerwin et al. | July 13, 1954 |
| 2,765,338 | Suter et al. | Oct. 2, 1956 |
| 2,773,899 | Martin et al. | Dec. 11, 1956 |

FOREIGN PATENTS

| | | |
|---|---|---|
| 406,151 | Germany | Nov. 14, 1924 |

OTHER REFERENCES

Grillot et al.: J.A.C.S., volume 76, pages 3969–71 (1954).

Dawson et al.: "Jour. Amer. Chem. Soc.," vol. 55, pages 2070–5 (1933).